United States Patent [19]

Chen et al.

[11] 4,176,050

[45] Nov. 27, 1979

[54] PRODUCTION OF HIGH V.I. LUBRICATING OIL STOCK

[75] Inventors: Nai Y. Chen, Titusville; William E. Garwood, Haddonfield; Alan W. Peters, Moorestown, all of N.J.

[73] Assignee: Mobil Oil Corporation, New York, N.Y.

[21] Appl. No.: 966,419

[22] Filed: Dec. 4, 1978

[51] Int. Cl.$^2$ .................. C10G 13/02; C07C 5/24; B01J 29/28

[52] U.S. Cl. .................... 208/111; 208/18; 208/120; 252/455 Z; 585/752; 585/841

[58] Field of Search ............. 208/111, 18; 252/455 Z, 252/477 R; 260/683.65

[56] References Cited

U.S. PATENT DOCUMENTS

| | | | |
|---|---|---|---|
| 3,668,113 | 6/1972 | Burbidge et al. | 208/97 |
| 3,700,585 | 10/1972 | Chen et al. | 208/111 |
| 3,702,886 | 11/1972 | Argauer et al. | 423/328 |
| 3,755,138 | 8/1973 | Chen | 208/111 |
| 3,894,938 | 9/1975 | Gorring et al. | 208/97 |
| 3,926,782 | 12/1975 | Plank et al. | 208/135 |
| 4,100,262 | 7/1978 | Pelrine | 423/329 |

*Primary Examiner*—Delbert E. Gantz
*Assistant Examiner*—G. E. Schmitkons
*Attorney, Agent, or Firm*—Charles A. Huggett; Vincent J. Frilette

[57] ABSTRACT

Waxy distillate lubricating oil stocks suitable for the preparation, by conventional unit processes, of high V.I., low pour point lubricating oils, are advantageously catalytically dewaxed with macrocrystalline ZSM-5 (crystallites larger than 2 microns) preferably associated with a hydrogenation metal such as platinum or palladium.

15 Claims, No Drawings

PRODUCTION OF HIGH V.I. LUBRICATING OIL STOCK

BACKGROUND OF THE INVENTION

1. Field of the Invention

This invention is concerned with the manufacture of high quality lubricating oils, and in particular with lubricating oils derived from petroleum distillate fractions. It is especially directed to the preparation of low pour point lubricating oils that have a high V.I. (V.I. will be used herein to denote "viscosity index") from crude oils of high wax content. This invention is particularly directed to catalytically dewaxing a waxy distillate lubricating oil with a ZSM-5 zeolite catalyst characterized by large crystals to obtain a lubricating oil of low pour point and of high V.I.

2. Prior Art

Refining suitable petroleum crude oils to obtain a variety of lubricating oils which function effectively in diverse environments has become a highly developed and complex art. Although the broad principles involved in refining are qualitatively understood, the art is encumbered by quantitative uncertainties which require considerable resort to empiricism in practical refining. Underlying these quantitative uncertainties is the complexity of the molecular constitution of lubricating oils. Because lubricating oils for the most part are based on petroleum fractions boiling above about 450° F., the molecular weight of the hydrocarbon constituents is high and these constituents display almost all conceivable structures and structure types. This complexity and its consequences are referred to in "Petroleum Refinery Engineering", by W. L. Nelson, McGraw Hill Book Company, Inc., New York, N.Y., 1958 (Fourth Edition), relevant portions of this text being incorporated herein by reference for background.

In general, the basic notion in lubricant refining is that a suitable crude oil, as shown by experience or by assay, contains a quantity of lubricant stock having a predetermined set of properties such as, for example, appropriate viscosity, oxidation stability, and maintenance of fluidity at low temperatures. The process of refining to isolate that lubricant stock consists of a set of subtractive unit operations which removes the unwanted components. The most important of these unit operations include distillation, solvent refining, and dewaxing, which basically are physical separation processes in the sense that if all the separated fractions were recombined one would reconstitute the crude oil.

A refined lubricant stock may be used as such as a lubricant, or it may be blended with another refined lubricant stock having somewhat different properties. Or, the refined lubricant stock, prior to use as a lubricant, may be compounded with one or more additives which function, for example, as antioxidants, extreme pressure additives, and V.I. improvers. As used herein, the term "stock", regardless whether or not the term is further qualified, will refer only to a hydrocarbon oil without additives. The term "raw stock" will be used herein to refer to a viscous distillate fraction of crude petroleum oil isolated by vacuum distillation of a reduced crude from atmospheric distillation, and before further processing, or its equivalent. The term "solvent-refined stock" will refer to an oil that has been solvent refined, for example with furfural. The term "dewaxed stock" will refer to an oil which has been treated by any method to remove or otherwise convert the wax contained therein and thereby reduce its pour point. The term "waxy", as used herein will refer to an oil of sufficient wax content to result in a pour point greater than +20° F. The term "stock", when unqualified, will be used herein generically to refer to the viscous fraction in any stage of refining, but in all cases free of additives.

Briefly, for the preparation of a high grade distillate lubricating oil stock, the current practice is to, vaccum distil an atmospheric tower residuum from an appropriate crude oil as the first step. This step provides one or more raw stocks within the boiling range of about 450 to 1050° F. After preparation of a raw stock of suitable boiling range, it is extracted with a solvent, e.g., furfural, phenol, or chlorex, which is selective for aromatic hydrocarbons, and which removes undesirable components. The raffinate from solvent refining is then dewaxed, for example by admixing with a solvent such as a blend of methyl ethyl ketone and toluene. The mixture is chilled to induce crystallization of the paraffin waxes which are then separated from the dewaxed dissolved raffinate in quantity sufficient to provide the desired pour point for the subsequently recovered raffinate.

Other processes such as hydrofinishing or clay percolation may be used if needed to reduce the nitrogen and sulfur content or improve the color of the lubricating oil stock.

Viscosity index (V.I.) is a quality parameter of considerable importance for distillate lubricating oils to be used in automotive engines and aircraft engines which are subject to wide variations in temperature. This Index is a series of numbers ranging from 0 to 100 which indicate the rate of change of viscosity with temperature. A viscosity index of 100 indicates an oil that does not tend to become viscous at low temperature or become thin at high temperatures. Measurement of the Saybolt Universal Viscosity of an oil at 100 and 210° F., and referral to correlations, provides a measure of the V.I. of the oil. For purposes of the present invention, whenever V.I. is referred to it is meant the V.I. as noted in the Viscosity Index tabulations of the ASTM (D567), published by ASTM, 1916 Race Street, Philadelphia 3, Pa., or equivalent.

To prepare high V.I. automotive and aircraft oils the refiner usually selects a crude oil relatively rich in paraffinic hydrocarbons, since experience has shown that crudes poor in paraffins, such as those commonly termed "naphthene-base" crudes yield little or no refined stock having a V.I. above about 40. (See Nelson, supra, pages 80–81 for classifications of crude oils). Suitable stocks for high V.I. oils, however, also contain substantial quantities of waxes which result in solvent-refined lubricating oil stocks of high pour point, i.e., a pour point substantially greater than +20° F. Thus, in general, the refining of crude oil to prepare acceptable high V.I. distillate stocks ordinarily includes dewaxing to reduce the pour point to not greater than +20° F. The refiner, in this step, often produces saleable paraffin wax by-product, thus in part defraying the high cost of the dewaxing step.

Raw distillate lubricating oil stocks usually do not have a particularly high V.I. However, solvent-refining, as with furfural for example, in addition to removing unstable and sludge-forming components from the crude distillate, also removes components which adversely affect the V.I. Thus, a solvent refined stock prior to dewaxing usually has a V.I. well in excess of specifications. Dewaxing, on the other hand, removes paraffins which have a V.I. of about 200, and thus reduces the V.I. of the dewaxed stock.

In recent years catalytic techniques have become available for dewaxing of petroleum stocks. A process of that nature developed by British Petroleum is described in The Oil and Gas Journal dated Jan. 6, 1975, at pages 69–73. See also U.S. Pat. No. 3,668,113.

In U.S. Pat. No. Re. 28,398 (of U.S. Pat. No. 3,700,585) to Chen, et al is described a process for catalytic dewaxing with a catalyst comprising zeolite ZSM-5. Such processes combined with catalytic hydrofinishing is described in U.S. Pat. No. 3,894,938. In U.S. Pat. No. 3,755,138 to Chen et al is described a process for mild solvent dewaxing to remove high quality wax from a lube stock, which is then catalytically dewaxed to specification pour point. The entire contents of these patents are herein incorporated by reference.

It is interesting to note that catalytic dewaxing, unlike prior-art dewaxing processes, although subtractive, is not a physical process but rather depends on transforming the straight chain and other waxy paraffins to non-wax materials. The process, however, is more economical and thus of industrial interest, even though at least some loss of saleable wax is inherent. Commercial interest in catalytic dewaxing is evidence of the need for more efficient refinery processes to produce low pour point lubricants.

It is an object of this invention to provide a process of improved selectivity for catalytically dewaxing a hydrocarbon oil boiling within the range of 450° to 1050° F. It is another object of this invention to provide a method for removing paraffin waxes from a lubricating oil stock with reduced loss of V.I. These and other objects will become apparent to one skilled in the art on reading this entire specification including the claims appended hereto.

BRIEF DESCRIPTION OF THE INVENTION

It has now been found that catalytic dewaxing of a distillate petroleum fraction characterized by a pour point of greater than +20° F. is advantageously achieved by utilizing as catalyst the hereinbelow described ZSM-5 zeolite of large crystal size, under process conditions more particularly described hereinbelow. The recovered dewaxed oil so produced has a V.I. measurably higher than that obtained with ZSM-5 catalyst of smaller crystal size. In a particularly preferred embodiment, the ZSM-5 zeolite having large crystals (hereinafter referred to as "macrocystalline ZSM-5") is in the hydrogen form and is employed in conjunction with a hydrogenation component such as platinum or palladium, and in the presence of hydrogen, and at a hydrocarbon partial pressure of at least about 75 psia.

DETAILED DESCRIPTION OF THE INVENTION

In the description which follows, particular reference will be made to the preparation of hydrocarbon lubricating oil stocks from suitable crude petroleum fractions. A suitable crude petroleum, for purposes of this invention, is one from which may be prepared (i.e., contains) a dewaxed lubricating oil having a V.I. of at least about 85, and a pour point not greater than +20° F., by conventional methods of distillation, solvent refining and dewaxing. Also contemplated as within the scope of this invention for use as feed thereto is any hydrocarbon lubricating oil stock boiling within the range of from about 450°, and preferably from about 600° to about 1050° F., and capable of yielding significant amounts of dewaxed lubricating oil having a V.I. of at least about 85 and a pour point not greater than +20° F. Thus, hydrocracked petroleum oils having the foregoing characteristics are included within the scope of this invention, as well as are other processed heavy oils whether derived from tar sands, coal, or from other sources. The boiling points herein referred to are boiling points at atmospheric pressure, and may be determined by vacuum assay in the manner known to those skilled in the art.

In a preferred embodiment of this invention, the raw stock hereinabove described is solvent refined by counter current extraction with at least an equal volume (100 vol.%) of a selective solvent such as furfural. It is preferred to use 1.5 to 2.5 volumes of solvent per volume of oil. The raffinate is subjected to catalytic dewaxing by mixing with hydrogen and contacting at 500° to about 750° F. with a catalyst containing a hydrogenation metal and macrocystalline ZSM-5 zeolite. The catalytic dewaxing is conducted at a liquid hourly space velocity (LHSV) of 0.1 to 5.0 volumes of charge oil per volume of catalyst per hour.

In some instances it may be desirable to partially dewax the solvent-refined stock by conventional solvent dewaxing techniques, say to a pour point from 10° to about 50° F., and preferably to a pour point greater than about +20° F., prior to catalytic dewaxing. The higher melting point waxes so removed are those of greater hardness and higher market value than the waxes removed in taking the product to a still lower pour point.

The cracked fragments from cracking wax molecules in the catalytic dewaxer will have adverse effects on flash and fire points of the product and preferably are therefore removed by distillation of the product to flash and fire point specifications.

The catalytic dewaxing step of this invention may be conducted by contacting the feed to be dewaxed with a fixed stationary bed of catalyst, with a fixed fluidized bed, or with a transport bed, as desired. A simple and therefore preferred configuration is a trickle-bed operation in which the feed is allowed to trickle through a stationary fixed bed, preferably in the presence of hydrogen. With such configuration, it is of considerable importance in order to obtain the benefits of this invention to initiate the reaction with fresh catalyst at a temperature of less than 600° F. This temperature is of course raised as the catalyst ages, in order to maintain catalytic activity. In general, the run is terminated at an end-of-run temperature of about 750° F., at which time the catalyst may be regenerated by contact at elevated temperature with hydrogen gas, for example. With the trickle-bed mode of operation, it has been found that particularly favorable results are achieved with a hydrocarbon partial pressure of at least about 75 psia. The improved selectivity induced by the maintenance of this hydrocarbon pressure is not understood but presumably results from some subtle changes in diffusion rates which favorably affects the selectivity of macrocrystalline ZSM-5. No effect of hydrocarbon partial pressure has been noted with ZSM-5 of small crystallite size. Contemplated as within the scope of this invention is to cofeed propane as a diluent to augment the dewaxing selectivity of macrocrystalline ZSM-5.

The macrocrystalline ZSM-5 catalyst utilized herein has a predominant crystalline size of at least 2 microns. That is, at least about 50wt.% of the crystals, and preferably at least 70wt.% of the crystals, have a crystallite size in the range of 2 to 10 microns. As will be shown hereinbelow, macrocrystalline ZSM-5 has unexpectedly been found to effect the reduction of pour point in catalytic dewaxing of a solvent-refined stock with less reduction of V.I. than is observed with ZSM-5 catalyst having a predominant crystallite size substantially less than 2 microns, such as a crystallite size of less than 0.2 microns. Thus, it is appropriate to refer to macrocrystalline ZSM-5 as being more selective than the smaller size crystals of the same zeolite in the process of the present invention.

The reason for the improved selectivity of macrocrystalline ZSM-5 is not well understood. However, it is known that ZSM-5 zeolite has a pore structure which is intermediate between the 5 Angstrom pore of zeolite 5A and the 10 to 13 Angstrom pore of the faujasite type zeolites, and it is known to selectively act in a catalytic manner not only on normal paraffins but also on paraffins of slightly branched structure. By virtue of this pore structure, straight chain hydrocarbons and slightly branched hydrocarbons are selectively converted within the pores of the catalyst. Without being bound by theory, it would appear that macrocrystalline ZSM-5 acts more selectively to convert the waxy components of the distillate lubricating oil with less conversion of the non-waxy paraffins which have a high viscosity index, thereby producing the observed novel effect of this invention. It has been observed that macrocrystalline ZSM-5 may be somewhat less active than the small-crystal variety of this zeolite. However, the improved selectivity more than offsets this disadvantage.

ZSM-5 zeolite is more particularly described in U.S. Pat. No. 3,702,886 to Argauer et al, the entire contents of which are incorporated herein by reference. The macrocrystalline ZSM-5 utilized in this invention has essentially the same x-ray diffraction pattern as noted in U.S. Pat. No. 3,702,886, which is reproduced herein for the hydrogen exchanged form and for the sodium exchanged forms.

TABLE I

| Observed d-Spacings, X-ray Diffraction ZSM-5 Powder | | |
|---|---|---|
| As made | HCl | NaCl |
| 11.15 | 11.16 | 11.19 |
| 10.01 | 10.03 | 10.05 |
| 9.74 | 9.78 | 9.80 |
| — | — | 9.01 |
| 8.06 | — | — |
| 7.44 | 7.46 | 7.46 |
| 7.08 | 7.07 | 7.09 |
| 6.70 | 6.72 | 6.73 |
| 6.36 | 6.38 | 6.38 |
| 5.99 | 6.00 | 6.01 |
| 5.70 | 5.71 | 5.73 |
| 5.56 | 5.98 | 5.98 |
| 5.37 | — | 5.38 |
| 5.13 | 5.11 | 5.14 |
| 4.99 | 5.01 | 5.01 |
| — | — | 4.74 |
| 4.61 | 4.62 | 4.62 |
| — | — | 4.46 |
| 4.36 | 4.37 | 4.37 |
| 4.26 | 4.27 | 4.27 |
| 4.08 | — | 4.09 |
| 4.00 | 4.01 | 4.01 |
| 3.84 | 3.85 | 3.85 |
| 3.82 | 3.82 | 3.82 |
| 3.75 | 3.75 | 3.75 |
| 3.72 | 3.72 | 3.72 |
| 3.64 | 3.65 | 3.65 |
| — | 3.60 | 3.60 |
| 3.48 | 3.49 | 3.49 |

TABLE I-continued

| Observed d-Spacings, X-ray Diffraction ZSM-5 Powder | | |
|---|---|---|
| As made | HCl | NaCl |
| 3.44 | 3.45 | 3.45 |
| 3.34 | 3.35 | 3.36 |
| 3.31 | 3.31 | 3.32 |
| 3.25 | 3.25 | 3.26 |
| 3.17 | — | — |
| 3.13 | 3.14 | 3.14 |
| 3.05 | 3.05 | 3.05 |
| 2.98 | 2.98 | 2.99 |
| — | 2.95 | 2.95 |
| 2.86 | 2.87 | 2.87 |
| 2.80 | — | — |
| 2.78 | — | — |
| 273 | 2.74 | 2.74 |
| 2.67 | — | — |
| 2.66 | — | — |
| 2.60 | 2.61 | 2.61 |
| — | 2.59 | — |
| 2.57 | — | 2.57 |
| 2.50 | 2.52 | 2.52 |
| 2.49 | 2.49 | 2.49 |
| 2.41 | 2.42 | 2.42 |
| 2.39 | 2.40 | 2.40 |
| — | 2.33 | — |
| — | 2.30 | — |
| — | 2.24 | 2.23 |
| — | 2.20 | 2.21 |
| — | 2.18 | 2.18 |
| — | — | 2.17 |
| — | 2.13 | — |
| — | 2.11 | 2.11 |
| — | 2.08 | 2.08 |
| — | — | 2.07 |
| 2.01 | 2.01 | 1.01 |
| 1.99 | 2.00 | 1.99 |
| 1.95 | 1.95 | 1.95 |
| — | 1.92 | 1.92 |
| 1.91 | — | — |
| 1.87 | 1.87 | 1.87 |
| — | 1.86 | — |
| 1.84 | 1.84 | — |
| 1.83 | 1.83 | 1.83 |
| 1.82 | — | 1.81 |
| 1.77 | 1.77 | 1.79 |
| 1.76 | 1.76 | 1.76 |
| — | — | 1.75 |
| — | 1.74 | 1.74 |
| 1.71 | 1.72 | 1.72 |
| 1.67 | 1.67 | 1.67 |
| 1.66 | 1.66 | — |
| — | — | 1.65 |
| — | — | 1.64 |
| — | 1.63 | 1.63 |
| — | 1.61 | 1.61 |
| 1.58 | — | — |
| — | 1.57 | 1.57 |
| — | — | 1.56 |

In the preparation of ZSM-5, the reaction conditions and the particular method of preparation affect the crystal size. A particular method for preparing macrocrystalline ZSM-5 is described in U.S. Pat. No. 4,100,262 to Pelrine, the entire contents of which are incorporated herein by reference. Another method for preparing macrocrystalline ZSM-5 is described in U.S. Patent application Ser. No. 825,369, filed Aug. 17, 1977, and now abandoned, the entire contents of which are incorporated herein by reference. The macrocrystalline ZSM-5 used in the instant invention preferably is at least partially in the hydrogen form. The original cations associated therewith may be replaced by a wide variety of other cations according to techniques well known in the art. Typical replacing cations would include hydrogen, ammonium and metal cations, including mixtures of the same. Of the replacing metallic cations, particular preference is given to cations of metals such as rare earth metals, manganese, calcium, as well as metals of Group II of the Periodic Table, e.g., zinc, and Group VIII of the Periodic Table, e.g., nickel. Chromium, molybdenum and tungsten may be used in combination with any of these metals.

Typical ion exchange techniques would be to contact the particular zeolite with a salt of the desired replacing cation or cations. Although a wide variety of salts can be employed, particular preference is given to chlorides, nitrates and sulfates.

Representative ion exchange techniques are disclosed in a wide variety of patents including U.S. Pat. No. 3,140,249; U.S. Pat. No. 3,140,251; and U.S. Pat. No. 3,140,253.

Following contact with solution of the desired replacing cation, the zeolite is then preferably washed with water and dried at a temperature ranging from 150° F. to about 600° F. and thereafter calcined in air or other inert gas at temperatures ranging from about 500° F. to 1500° F. for periods of time ranging from 1 to 48 hours or more. It has been further found that catalyst of improved selectivity and other beneficial properties is obtained by subjecting the zeolite to treatment with steam at elevated temperatures ranging from 800° F. to 1500° F. and preferably 1000° F. and 1400° F. The treatment may be accomplished in atmospheres of 100% steam of an atmosphere consisting of steam and a gas which is substantially inert to the zeolites.

A similar treatment can be accomplished at lower temperatures and elevated pressures, e.g., 350°–700° F. at 10 to about 200 atmospheres. The macrocrystalline ZSM-5 preferably is used in intimate combination with a hydrogenating component such as tungsten, vanadium, molybdenum, rhenium, nickel, cobalt, chromium, manganese, or a noble metal such as platinum or palladium. Such component can be exchanged into the composition, impregnated therein or physically intimately admixed therewith. Such component can be impregnated in or onto zeolite such as, for example, by in the use of platinum, treating the zeolite with a platinum metal-containing ion. Thus, suitable platinum compounds include chloroplatinic acid, platinous chloride and various compounds containing the platinum amine complex. Platinum and palladium are preferred hydrogenation components.

The compounds of the useful platinum or other metals can be divided into compounds in which the metal is present in the cation of the compound and compounds in which it is present in the anion of the compound. Both types of compounds which contain the metal in the ionic state can be used. A solution in which platinum metals are in the form of a cation or cationic complex, e.g. $Pt(NH_2)_4Cl_2$ is particularly useful.

Prior to use, the zeolites should be dehydrated at least partially. This can be done by heating to a temperature in the range of 200° to 600° C. in an inert atmosphere, such as air, nitrogen, etc. and at atmospheric or subatmospheric pressures for between 1 and 48 hours. Dehydration can also be performed at lower temperatures merely by using a vacuum, but a longer time is required to obtain sufficient amount of dehydration.

As has heretofore been pointed out, the novel process of this invention is concerned with dewaxing of hydrocarbon feedstocks. The term "dewaxing" as used in the specification and claims is used in its broadest sense and is intended to mean the removal of those hydrocarbons which readily solidify (waxes) from petroleum stocks.

The improved process of this invention will now be illustrated by examples which are not to be construed as limiting the invention as described in this specification including the attached claims. All parts and proportions in these examples are by weight unless explicitly stated to be otherwise.

EXAMPLE 1

This example illustrates catalytic dewaxing with a prior art nickel-hydrogen ZSM-5 catalyst having a crystalline size of 0.02 microns and a nickel content of about 1.0 wt.%.

A partially solvent-dewaxed, solvent-refined lubricating oil stock having the following properties was passed with hydrogen in a trickle-bed reactor containing said prior art catalyst.

| Chargestock Properties | |
|---|---|
| | Charge |
| Gravity, °API | 30.6 |
| Specific gravity | 0.8729 |
| Pour Point, °F. | +45 |
| K.V. at 40° C., cs. | 29.08 |
| K.V. at 100° C., cs. | 5.01 |
| Flash Point, °F. (C.O.C.) | 420 |

The dewaxing conditions and the product properties are given in Table II.

EXAMPLES 2-3

The same chargestock as used in Example 1 was contacted with the hydrogen form of macrocrystalline ZSM-5 having no hydrogenation metal. The results are shown in Table III. The catalyst was fresh, and Example 3 illustrates the effect of increasing the hydrocarbon partial pressure.

TABLE II

| | EXAMPLE 1 |
|---|---|
| Time on Stream, Days | 2.5 |
| Pressure, psig | 400 |
| LHSV | 1.1 |
| $H_2$, SCF/bbl | 2500 |
| Average Catalyst Temp. °F. | 535 |
| Liquid Product, °API | 33.1 |
| Material Balance, Wt. % | 93.4 |
| Yields, Wt. % (No loss basis) | |
| $C_1 + C_2$ | 0.1 |
| $C_3$ | 3.7 |
| $C_4$ | 3.2 |
| $C_5$ | 2.4 |
| $C_6$-610° F. | 0.7 |
| 610° F. + Lube | 89.9 |
| Pour Point, °F. | −15 |
| K.V. at 40° C. cs. | 35.62 |
| K.V. at 100° C. cs. | 5.55 |
| V.I. (actual) | 89 |
| V.I. Calculated for +5° F. Pour | 93 |

TABLE III

| | EXAMPLE 2 | EXAMPLE 3 |
|---|---|---|
| Time on Stream, Days | 0.9 | 1.1 |
| Pressure, psig | 400 | 400 |
| LHSV | 1.0 | 2.0 |
| $H_2$, SCF/bbl | 2500 | 1250 |
| Average Catalyst Temp. °F. | 549 | 548 |
| Liquid Product, °API | 32.0 | 31.7 |
| Material Balance, Wt. % | 96.8 | — |
| Yields, Wt. % (No loss basis) | | |
| $C_1 + C_2$ | 0.2 | — |
| $C_3$ | 6.8 | — |
| $C_4$ | 3.6 | — |

TABLE III-continued

|  | EXAMPLE 2 | EXAMPLE 3 |
|---|---|---|
| $C_5$ | 1.7 | — |
| $C_6$-610° F. | Nil | — |
| 610° F. + Lube | 87.7 | — |
| Gravity, °API | 30.2 | 30.7 |
| Specific Gravity | 0.8805 | 0.8724 |
| Pour Point, °F., | −10 | +10 |
| K.V. at 40° C., cs. | 35.38 | 30.51 |
| K.V. at 100° C., cs. | 5.60 | 5.22 |
| V.I. (actual) | 90.5 | 100.5 |
| Flash Point, °F. (C.O.C.) | — | 400 |
| V.I. Calculated for +5° F. Pour | 93.5 | 99.5 |

What is claimed is:

1. In a process for manufacturing a refined lubricating oil stock having a V.I. of at least 85 and a pour point not greater than +20° F. from a waxy stock boiling within the range of from about 450° to about 1050° F., said process comprising catalytically dewaxing said waxy stock to a pour point not greater than +20° F., the improvement whereby effecting said dewaxing with increased selectivity, which comprises: contacting said waxy stock with a catalyst comprising macrocrystalline ZSM-5 at a LHSV of from 0.1 to 5.0, a temperature from about 500 to about 750° F., and under a total pressure greater than about 100 psia; and recovering a dewaxed oil stock with a pour point not greater than +20° F.

2. The process claimed in claim 1 wherein said contacting is done in the presence of hydrogen and said macrocrystalline ZSM-5 is associated with a hydrogenation metal.

3. The process claimed in claim 2 wherein said hydrogenation metal is selected from the group consisting of platinum, palladium, or a mixture of palladium and zinc.

4. The process claimed in claim 2 wherein said hydrogenation metal is nickel.

5. The process claimed in claim 2 or claim 3 or claim 4 wherein said contacting is effected at a temperature from about 500° to about 600° F. with fresh catalyst.

6. The process claimed in claim 2 or claim 3 or claim 4 wherein a hydrocarbon partial pressure of at least 75 psia is maintained during said contacting step.

7. The process claimed in claim 2 including the step of partially solvent dewaxing said waxy stock.

8. The process claimed in claim 7 wherein said hydrogenation metal is selected from the group consisting of platinum, palladium, or a mixture of palladium and zinc.

9. The process claimed in claim 7 wherein said hydrogenation metal is nickel.

10. The process claimed in claim 7 or claim 8 or claim 9 wherein said contacting is effected at a temperature from about 500° to about 600° F. with fresh catalyst.

11. The process described in claim 7 or claim 8 or claim 9 wherein a hydrocarbon partial pressure of at least 75 psia is maintained during said contacting step.

12. The process claimed in claim 1 wherein said waxy stock is a waxy solvent-refined stock.

13. The process claimed in claim 2 wherein said waxy stock is a waxy solvent-refined stock.

14. The process claimed in claim 3 wherein said waxy stock is a waxy solvent-refined stock.

15. The process claimed in claim 4 wherein said waxy stock is a waxy solvent-refined stock.

* * * * *